Sept. 17, 1963 H. KITTEL ETAL 3,104,002
CARRIAGE MOTION CONTROL ARRANGEMENT
Filed Feb. 28, 1961 7 Sheets-Sheet 5

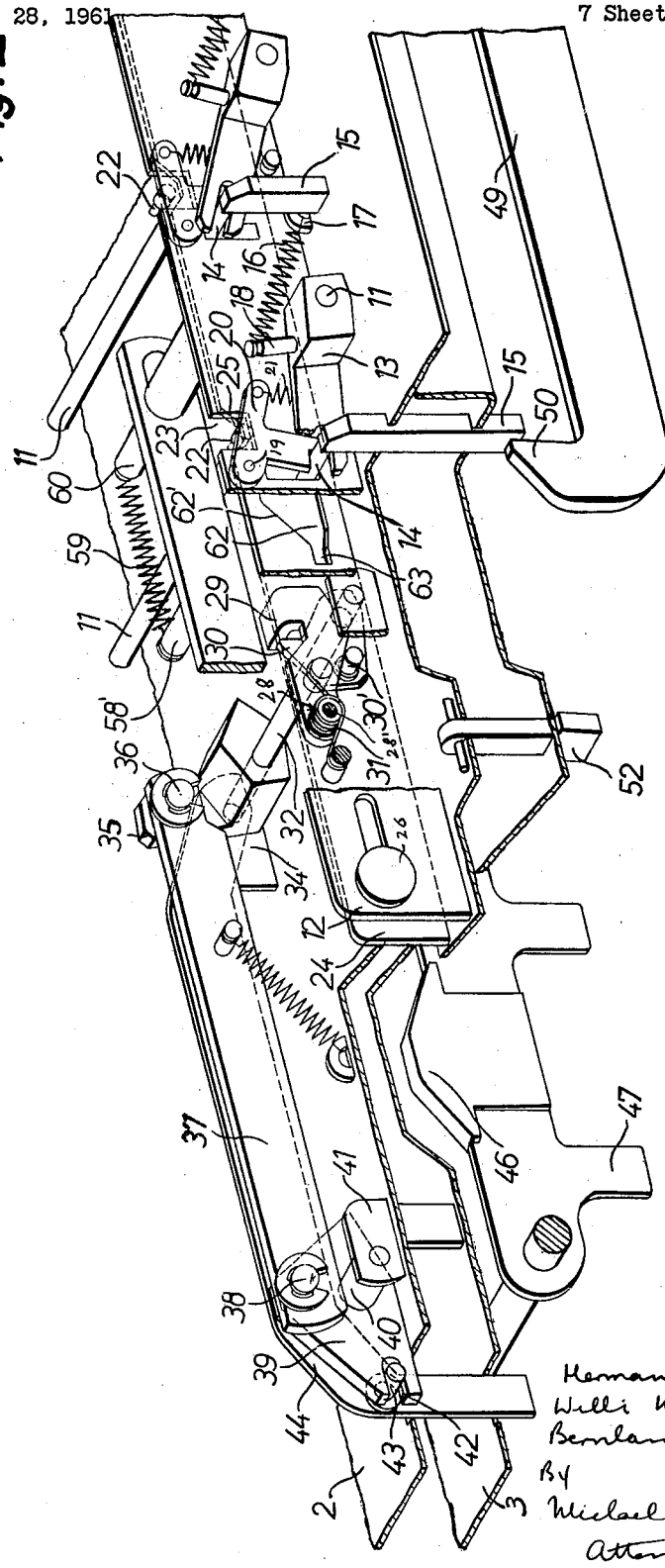

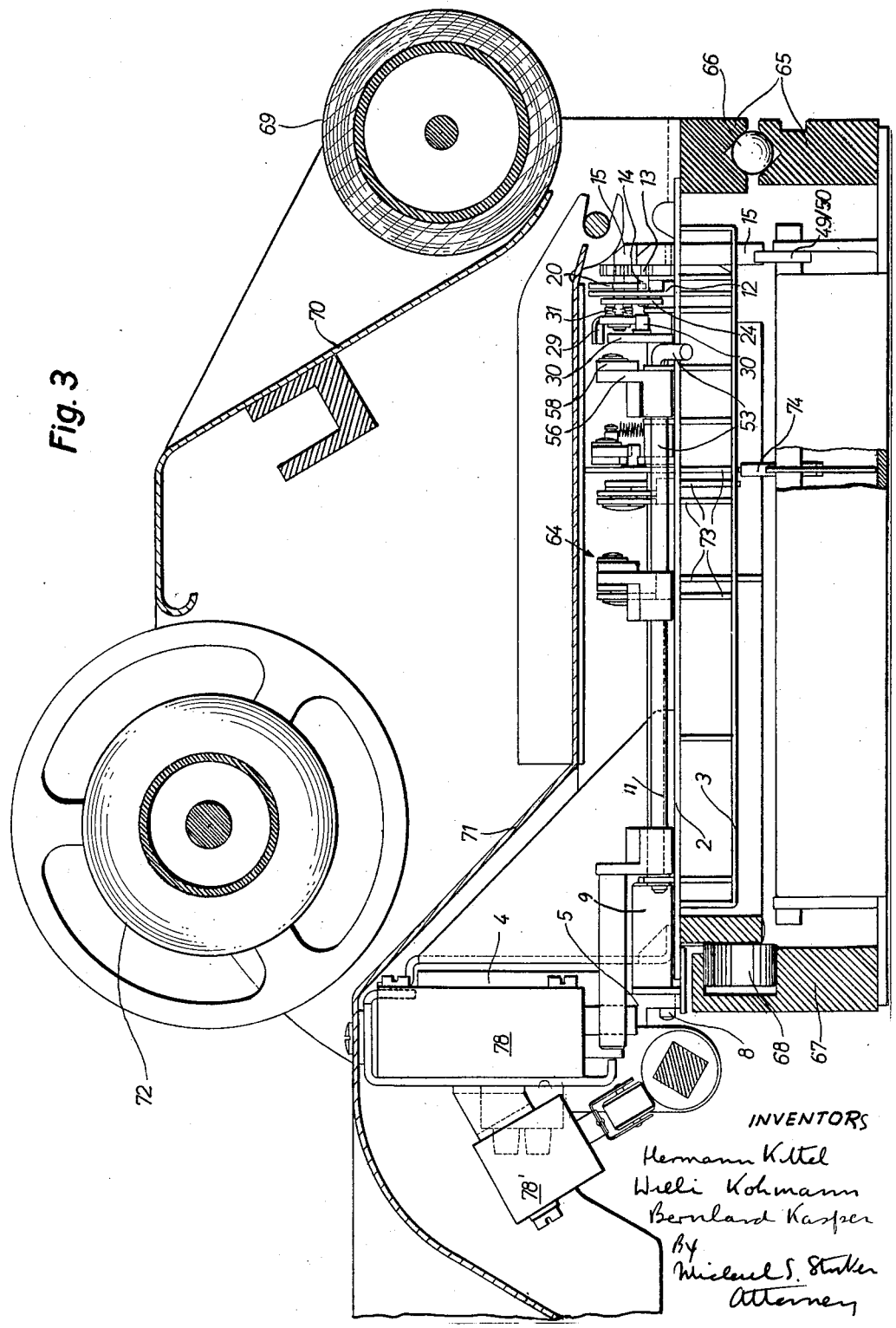

INVENTORS
Hermann Kittel
Willi Kohmann
Bernhard Kasper
BY Michael S. Striker
Attorney

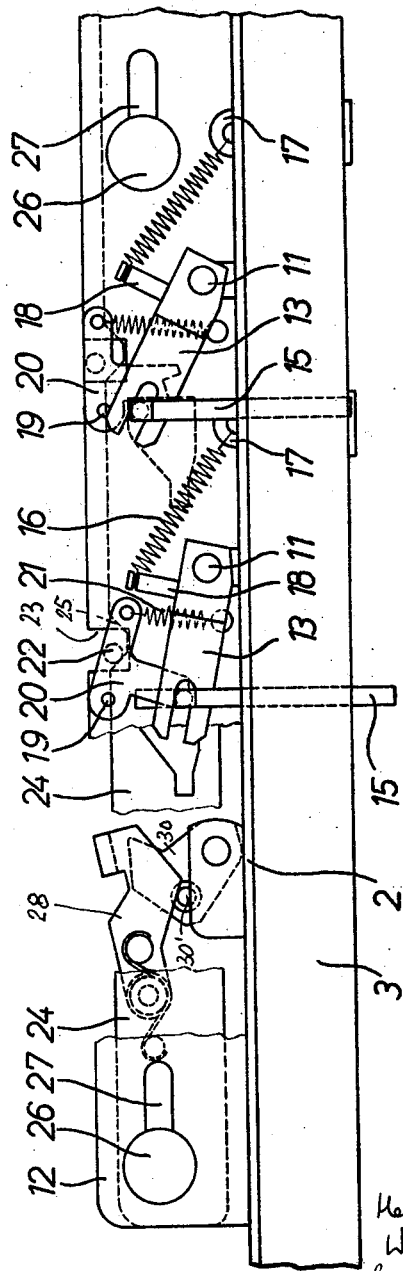

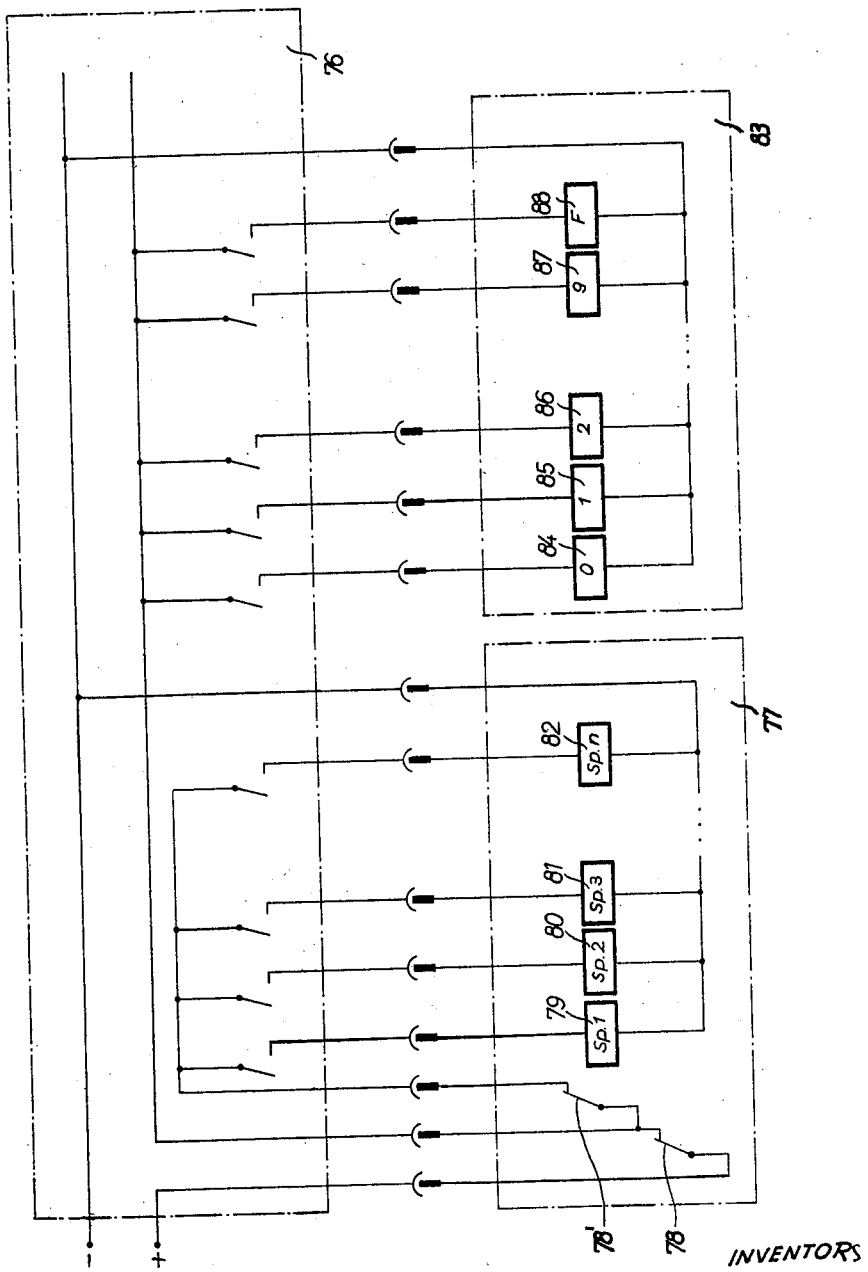

United States Patent Office

3,104,002
Patented Sept. 17, 1963

3,104,002
CARRIAGE MOTION CONTROL ARRANGEMENT
Hermann Kittel, Willi Kohmann, and Bernhard Kasper, all of Villingen, Black Forest, Germany, assignors to Kienzle Apparate G.m.b.H., Villingen, Black Forest, Germany
Filed Feb. 28, 1961, Ser. No. 92,325
24 Claims. (Cl. 197—177)

The present invention relates to a carriage motion control arrangement for an accounting machine, and more particularly to a tabulator apparatus permitting a tabulating independently of a program.

Tabulating apparatus is known in which tabs correlated to columns of the typed form are set on a program bridge of the carriage of the machine so that once the program is determined, the carriage is stopped where printing in columns of a form is intended in accordance with the program.

Control bridges with tabs are also known, which permit the selection of one of two tabulating programs which are set on the same program bridge. In this event, either the first program, which provides stops in the second, fourth, fifth and seventh column, or the second program which provides stops in the first, third, fifth and sixth column is effective. This construction does not permit a movement of the carriage from its initial terminal position to a selected column, but permits only movement of the carriage either to the first, or to the second column in accordance with the selected program. The carriage is automatically stopped by each tab set on the program bridge, and a machine cycle is required to effect movement of the carriage to the respective next following column position. In the event that it is desired to set a third different program on the machine, the program bridge must be removed from the carriage, and the tabs differently set.

The apparatus of the known art renders certain accounting operations very time-consuming. Even if a skip key is provided which, when actuated, permits the carriage to skip the respective column tab, the carriage motions are substantially determined by the program.

It is one object of the present invention is to overcome the disadvantages of the known program controlled tabulating arrangement, and to provide a carriage motion control arrangement for stopping the carriage of an accounting machine in any desired and selected column position.

Another object of the present invention is to provide means for shifting tabulator tabs selectively to and from an operative position in which they effect stopping of the carriage in a selected column position.

Another object of the present invention is to provide an electrically controlled arrangement for setting the tabs on a program carriage of an accounting machine.

Another object of the present invention is to provide a tabulating arrangement permitting motion of the carriage of an accounting machine to a single selected column position, and return of the carriage from the selected column position.

Another object of the present invention is to provide tabs which are individually shiftable to an operative position, and to provide first means for selectively shifting each tab to the operative position, and second means for simultaneously shifting all tabs to the operating position as is desired during a summing operation.

Another object of the present invention is to provide a tabulating arrangement which permits the simultaneous selecting of the same program on a plurality of accounting machines.

Another object of the present invention is to provide an arrangement permitting the setting of different programs in a plurality of accounting machines by a single control device electrically connected to all accounting machines.

A further object of the present invention is to provide an arrangement by which a selected program can be set under control of a manually operated electrical transmitting device, as well as under control of punch cards, or of other programming means.

A further object of the present invention is to provide an accounting machine in which no parts have to be exchanged or reset when the program is changed.

With these objects in view, the present invention relates to a carriage motion control arrangement for an accounting machine, the arrangement comprising a carriage which supports a form having columns which may be printed by suitable printing means; a set of tab means mounted on the carriage for movement with the same and being shiftable to and from an operative position; and a set of operating means including electromagnetic means for moving selected tab means to and from the operative position.

During the movement of the carriage, the tab means in operative position move along a certain path, and tabulator stop means are located in this path to stop the carriage when engaging a tab means set to the operative position. In this manner, the carriage can be stopped in selected positions correlated with columns selected by shifting the respective tabs to the operative position.

In the preferred embodiment, the tabs are urged by springs to move to an inoperative position, and are shifted by electromagnetic means to the operative position. Spring loaded locking means lock each tab which is in its operative position, and means are provided for releasing the locking means so that the tabs automatically move out of the operative position and assume an inoperative position after completion of an operation.

In the preferred embodiment of the invention, the locking means include a set of locking members respectively cooperating with the tabs, but all locking members are simultaneously controlled to release the tabs when the carriage arrives at its initial terminal position after having been stopped by the respective operative tab. For this purpose, a cam is provided which in the initial position of the carriage, engages a linkage means operatively connected to the locking members. The linkage means include a slide having cam edges cooperating with the locking members, and being shifted when the carriage arrives in its initial terminal position.

The slide is formed with cutouts having cam edges cooperating with the tabs when the slide is further shifted, so that all tabs may be shifted to the operative position thereof, when desired for the purpose of stopping the carriage in each column during a summing operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 is a fragmentary perspective view on a larger scale illustrating a portion of the motion control arrangement illustrated in FIG. 1 in a tabulating position stopped in a selected column position;

FIG. 3 is a side view of the embodiment shown in FIG. 1, partly in section;

FIG. 5 is a fragmentary front view on an enlarged scale showing the arrangement in the initial position of FIG. 1; and FIG. 6 is a diagram illustrating the electric circuit for controlling the apparatus of the invention.

Figure 1A:
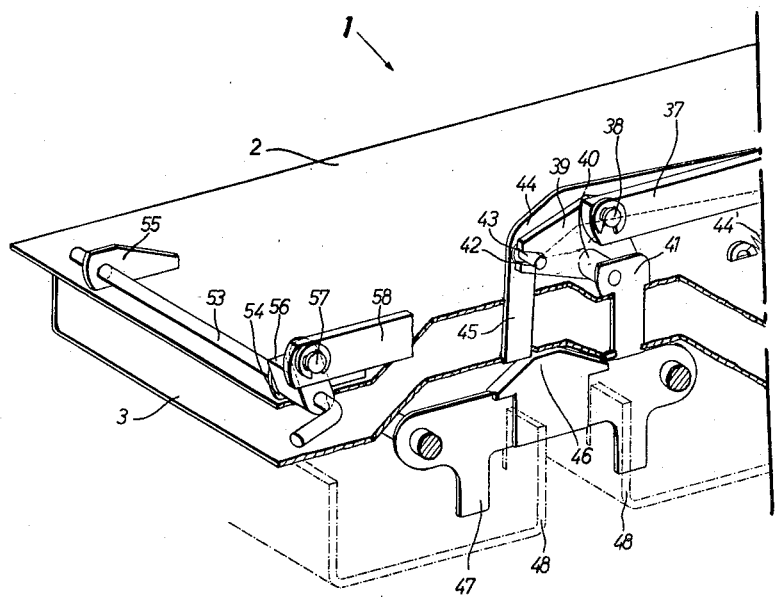
FIG. 1 is a fragmentary perspective view including two separated portions FIGS. 1a and 1b illustrating the motion control arrangement according to one embodiment of the invention in an initial position.

Referring now to the drawings, and more particularly to FIG. 3, the paper carriage of the machine supports a platen roll 69 which receives a band-shaped ledger form from a reel 72 through paper guides 70 and 71. The paper carriage has rolls 68 running on a rail 67 in the rear of the machine, while balls 66 guide the front part of the paper carriage on a rail 65. A control plate or control bridge including a top plate 2 and a lower plate 3 is supported on the paper carriage in such a manner that it can be exchanged.

Figure 1B:
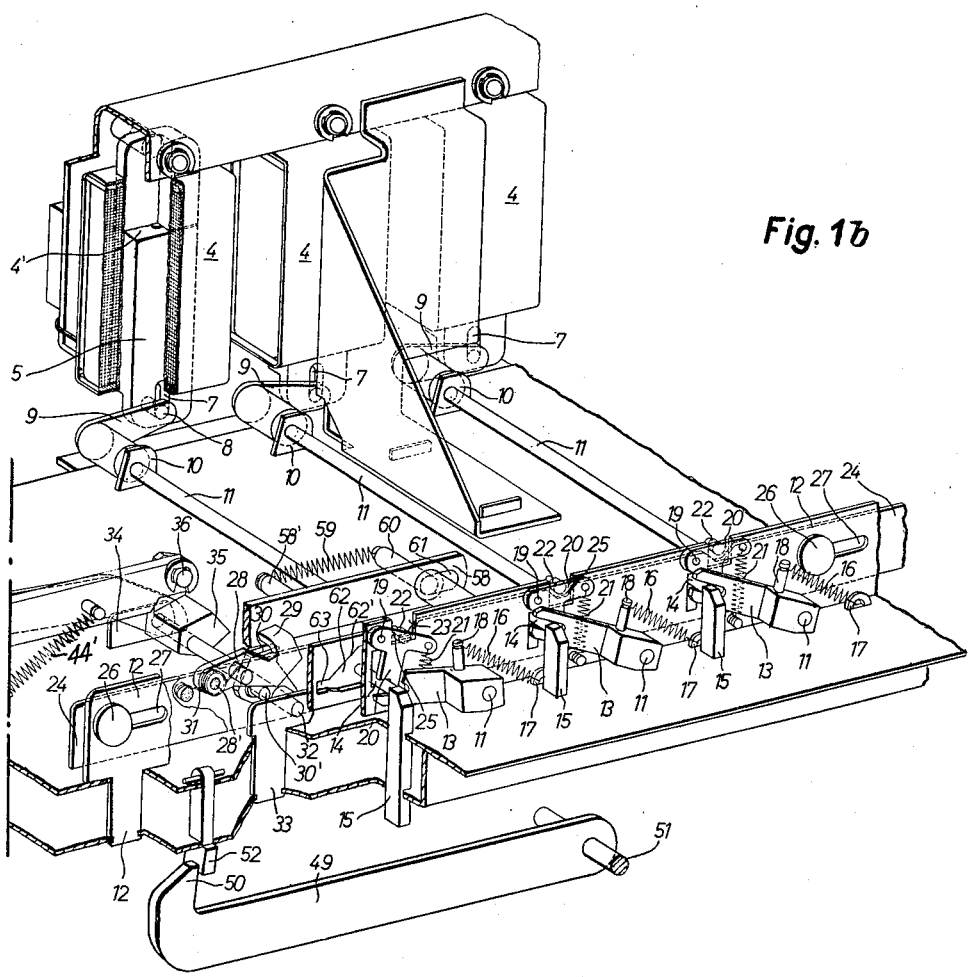

As best seen in FIGS. 1 and 2, control plate 2, 3 is a part of the motion control arrangement 1 according to the present invention. The plates 2 and 3 are provided with exactly aligned slots, not shown in the drawing for the sake of simplicity, in which tabs or stops 73 are mounted. The stops 73 cooperate with sensing levers 74, only one of which is shown in FIG. 3. Stops 73 are set in accordance with a program, and actuation of a sensing lever 74 by a stop 73 will cause an operation of the machine. A set of tabs 15 are mounted on the control plate 2, 3 spaced in accordance with columns of the paper form which is to be printed on the carriage, each tab 15 being movable between a higher inoperative position and a lower operative position.

A tabulator stop lever 49 is turnable about shaft 51 which is mounted in the stationary frame of the machine, and has a projecting stop part 50 located in the path of movement of a tab 15 in its operative position, but will pass tabs 15 in the retracted inoperative position. FIG. 1 illustrates the arrangement in the initial terminal position of the carriage in which the stop means 49, 50 engages a stop 52 on the control plate 2, 3.

Each tab 15 has a transverse projecting pin 14 secured thereto and located in the recess of a bifurcated operating lever 13 which is secured to a shaft 11. Shafts 11 are mounted in brackets 10 on top plate 2, and on an upright wall 12 which is secured to the control plate 2, 3. A set of electromagnetic means 4 is mounted near the rear edge of the control plate 2, 3, and each electromagnetic means has a movable armature 5 with a slot 7 in which a pin 8 of a lever 9 is guided. Levers 9 are secured to shafts 11, so that each electromagnetic means, when energized, will effect turning of the respective shaft 11 and the respective operating lever 13 in counterclockwise direction against the action of a spring 16 which is secured to a pin 18 on operating lever 13 and to an eyelet 17 on the control plate 2, 3. Due to the bifurcated end portion of levers 13, which is shown broken off in FIGS. 1 and 2 for the first lever 13, the respective tab will be shifted down to its operative position. When the electromagnetic means of a tab 15 is not energized, spring 16 will pull operating lever 13 and the respective tab 15 to the higher inoperative position shown for the tabs on the right side of the drawing.

Each tab 15 is locked in the operative position by a locking lever 20. Each locking lever is mounted on wall 12 on a pivot pin 19, and is urged by spring 21 to turn in clockwise direction. In the inoperative position of the tabs 15, the pins 14 abut a lateral edge of the locking lever 20 so that spring 21 cannot turn the locking lever. However, when the tab 15 is shifted to its lower operative position, pin 14 slides along the lateral edge of the locking lever until it is located opposite a cutout which permits spring 21 to turn the locking lever in clockwise direction into a locking position in which tab 15 cannot be moved back to its inoperative position by operating lever 13 under the action of spring 16.

A slide 24 is mounted on the upright wall 12 and has two guide members 26 which are slidably guided in guide slots 27 of wall 12 so that slide 24 can be shifted in longitudinal direction of wall 12. Slide 24 has an upper edge formed with cutouts of trapezoidal shape, each cutout 25 receiving a pin 22 secured to one of the locking levers 20. Corresponding rectangular cutouts 23 are provided in wall 12 and substantially aligned with cutouts 25 and it is apparent that the shape of the cutouts 23 and 25 permits pin 22 to move when the respective locking lever 20 turns to and from its locking position.

When slide 24 is shifted to the right as viewed in FIGS. 1 and 2, the inclined trailing edges of cutouts 25 will act as camming edges acting on the pin 22 of a locking lever 20 in locking position so that the respective locking lever 20 is turned in counterclockwise direction until its cutout releases pin 14 of the respective tab 15, permitting the tab to return to its inoperative position under the action of the spring-loaded operating lever 13. This operation is effected by shifting slide 24 a first distance in which the guide members 26 have not yet reached the ends of slots 27.

Slide 24 has a set of openings 62 which have oblique trailing camming edges 62' and narrow parts 63. Each pin 14 projects through an opening in wall 12 into an opening 62. The cam means 62' are spaced from pins 14 such a distance that in the shifted position of slide 24 in which the trailing cam edges of cutouts 25 release the locking levers, pins 14 are not yet engaged by the cam means 62'. However, when slide 24 is shifted further to the right as viewed in FIGS. 1 and 2, then cam means 62' of all openings 62 will engage all pins 14 in inoperative position, and will press all tabs 15 down until they assume the lower operative position in which pins 14 are located in the narrow portions 63, and thereby locked by the slide 24 in the operative position, while locking levers 20 remain ineffective since the pins 22 rest on the upper edge of slide 24 and prevent turning of the locking levers 20 although pins 14 are located opposite the cutouts in locking levers 20. When slide 24 is shifted back from this extreme shifted position to the position shown in FIG. 1, all tabs 15 are free to return to the inoperative position under the control of the spring-loaded levers 13.

A coupling member 28 is turnable on a pivot pin 28' which is secured to slide 24. A spring 31 is secured to wall 12 and to coupling member 28 and biases the same to turn in clockwise direction. However, the lower edge of coupling member 28 abuts a pin 30' of a control member 30 secured to a shaft 32 which is turnably mounted in a pair of bearing brackets 33 and 34 on control plate 2, 3. A lever 35 is fixed to shaft 32 and is connected by a pin 36 to a link 37 whose other end is connected by a pin 38 to a lever 39 which is mounted on a shaft 40 on a bearing bracket 41. Lever 39 has a slot 42 receiving a pin 43 fixed to an angular lever 44 which has one arm turnably mounted on shaft 32 between lever 35 and bearing bracket 34, and another arm 45 which extends downwardly through plate 2, 3. A spring 44' is secured to control plate 2, 3 and to lever 44 and urges the same to turn in counterclockwise direction until arm 45 engages a stationary cam 46 which is supported on a bracket 47 in the stationary frame 48 of the accounting machine. Cam 46 is disposed in such a manner that a dwell is engaged by the cam follower arm 45 when the paper carriage of the accounting machine is located in the initial terminal position in which the printing means of the accounting machine are located on the left side of the paper form on the paper carriage.

This position is determined by the stop 52 on the control plate 2, 3.

As long as cam 46 prevents turning movement of lever 44, 45, lever 39 is blocked by pin 43, and lever 35 with shaft 32 and control member 30 are blocked. Consequently, coupling member 28 cannot turn under the action of spring 31, since pin 30' on control member 30 blocks such movement.

However, when control plate 2, 3 moves with the paper carriage to the left as viewed in FIG. 1, which is obtained by a downward pivotal movement of stop lever 49, lever 44 will turn in clockwise direction when cam follower arm 45 has passed the dwell of cam 46, and such turning movement will be transmitted to control member 30 which will turn in counterclockwise direction with pin 30' permitting coupling member 28 to turn in clockwise direction under the action of spring 31.

Control member 30 has a control portion cooperating with a transverse projecting part 29 of coupling member 28. When control member 30 turns in counterclockwise direction while coupling member 28 turns in clockwise direction, the two members assume a relative position shown in FIG. 2 in which the coupling portion 29 of coupling member 28 abuts the control portion of control member 30.

When control member 30 is turned in this position in clockwise direction, the control portion of control member 30 presses coupling portion 29 and thereby coupling member 28 to the right, so that slide 24 moves to the right as viewed in FIG. 2 since coupling member 28, 29 is secured to slide 24. During such clockwise turning movement in the position of FIG. 2, pin 30' moves up and gradually urges coupling member 28 to turn in counterclockwise direction against the action of spring 31 until its coupling portion 29 moves up to a position in which its edge releases the control portion of control member 30 so that further turning of control member 30 in clockwise direction has no influence on slide 24. At this moment, control slide 24 is in a first shifted position displaced to such an extent that the trailing cam edges of cutouts 25 have pushed pin 22 of an operative locking member 20 to a position located on the upper edge of slide 24 so that the respective locking member 20 releases the respective tab pin 14.

As shown in FIGS. 1 and 3, a shaft 53 is mounted on control plate 2, 3 in bearing brackets 54 and 55. A lever 56 is fixed to shaft 53 and connected by a pin 57 to a link 58 which carries a projecting stud 58'. A spring 59 connects stud 58' with a stud 60 which is secured to slide 24 and passes through a slot 61 in the other end of link 58. Slot 61 permits movement of stud 60 with slide 24 when the same is shifted by control member 30 acting on coupling member 29.

When shaft 53 is turned in clockwise direction, which can be automatically effected by the control means of the accounting means, or by operation of a corresponding manually operated key, link 58 is shifted to the right, and since stud 60 is located at the end of slot 61, slide 24 is shifted to another shifted position in which slide 24 is so far displaced that the cam edges 62' of openings 62 engage the pins 14 of all tabs 15 and push tabs 15 down until all pins 14 are located in the narrow recesses 63 which lock all tabs 15 in the lower operative position. When shaft 53 is turned in counterclockwise direction, link 58 is shifted to the left so that spring 59 withdraws slide 24 to its initial position shown in FIG. 1 in which the tabs 15 are no longer locked by recesses 63 and are free to return to the inoperative position under the action of the spring-loaded levers 13. The operation of shaft 53 is described in detail in the copending patent application Maier Serial No. 700,197, filed December 2, 1957, now abandoned, in which shaft 17 corresponds to the shaft 53 of the present invention.

The electric circuit of the control apparatus is shown in FIG. 6 which illustrates a completely automatic electric control of the accounting machine provided with the carriage motion control arrangement of the present invention. The rectangular block 76 shown in chain lines represents a known transmitter having a number of switch contacts. The rectangular block 77 is the apparatus which includes four illustrated electromagnetic means 4 designated by reference numerals 79, 80, 81 and 82. Each electromagnetic 79 to 82 is associated with a column of the form on the paper carriage. Switch means 78 and 78' are connected in series, and also connected to the transmitter 76.

The rectangular block 83 represents a so-called "Addiutant" as disclosed, for instance, in the U.S. Patent No. 1,753,991, which is a device for operating the keys of the accounting machine by electromagnetic means 84, 85, 86, 87, 88 which are controlled from the transmitter 76. When switch 78 is closed, the key operating device 83 is connected to the voltage source, and when switch 78' is closed, the carriage motion control arrangement 77 is also connected to the voltage source. Thereafter, operation of the switch contacts in the transmitter 76 will effect the desired operations through the electromagnetic means, for example seting of a tab 15 to the operative position, for example by energizing electromagnetic means 79, which corresponds to the electromagnetic means 4 in FIGS. 1 and 3. Consequently, transmitter 76 constitutes a control means for energizing electromagnetic means 4.

Operation

Figure 4:
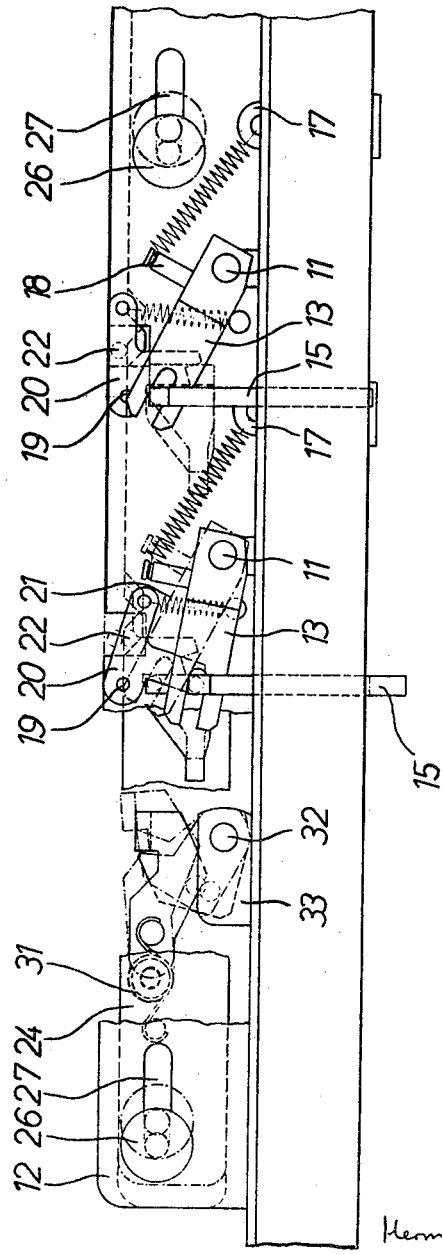
FIG. 4 is a fragmentary front view of the arrangement in the operational position of FIG. 2.

After each posting operation in a selected column of the paper form on the paper carriage, the paper carriage is returned by conventional apparatus to the initial terminal position shown in FIG. 1. The switch contact in transmitter 76 connected to electromagnetic means 79 is closed, which corresponds to the energizing of the first electromagnetic means 4 from the left, as viewed in FIG. 1, so that armature 5 is shifted and turns lever 9, shaft 11, and operating lever 13 in counterclockwise direction until the tab 15 is shifted to its operative position. The respective locking lever 20 turns under the action of spring 21 and locks tab 15 in the operative position while its pin 22 is located in a lower position engaging the left cam edge of cutout 25, as best seen in FIGS. 4 and 5. Since locking lever 20 locks tab 15, tab 15 cannot be returned to its inoperative position by spring-loaded lever 13 when the impulse in the coil 4' of the electromagnetic means 4 is terminated.

Simultaneously with the energizing of a selected electromagnetic means 4, a blank cycle of the accounting machine is started, which effects a short pivotal movement of the tabulator stop lever 49 in counterclockwise direction so that the stop portion 50 releases stop 52 on the control plate 1, 2, and permits movement of the paper carriage to the left as viewed in FIGS. 1 and 2.

Shortly after the start of such movement, cam follower portion 45 of lever 44 passes beyond the extremity of cam 46 and spring 44' turns lever 44 while cam follower 45 slides down on the inclined cam portion of cam 46. Such turning movement of lever 44 about shaft 32 effects turning of lever 39, and through link 37, turning of lever 34 together with shaft 32 and control member 30 in counterclockwise direction.

Control pin 30' moves downward, permitting coupling member 28 to follow and to turn in clockwise direction until the control portion of control member 30 engages the edge of coupling portion 29 in the position shown in FIG. 2 and FIG. 4.

In this position of the parts, the paper carriage moves further to the left until the stop portion 50 of tabulator lever 49 abuts the first tab 15 in operative position, the tab 15 associated with the first column having been selected in the example illustrated in FIGS. 1 and 2. Consequently, the paper carriage stops in a position in which the printing means of the accounting machine are located opposite the first column of a form held on the platen roll 69 of the paper carriage. An entry can now be posted in the respective column, whereupon the carriage return is started so that the carriage moves with the control plate 2, 3 to the right as viewed in FIGS. 1 and 2. Shortly before the carriage arrives in its initial terminal position, cam follower arm 45 rides up the inclined cam track portion of cam 46 so that control member 30 is turned in clockwise direction. During such turning movement, the control portion of control member 30 presses against the edge of the coupling portion 29 of coupling member 28, and acts through coupling member 28 and pin 28' to shift slide 24 to the right as viewed in FIGS. 1, 2, and 4 so that pin 22 of the first locking lever 20 rides up the trailing cam edge of recess 25 until it is located outside of the respective cutout 25 and on the upper edge of slide 24, as shown in broken lines in FIG. 4. During the clockwise turning of control member 30, control pin 30' moves up and urges coupling member 28 to turn in counterclockwise direction until the coupling portion 29 releases control member 30 and assumes the position shown in FIGS. 1 and 5. At this moment, the driving connection between control member 30 and coupling member 28, 29 is interrupted, so that the slide 24 stops before pins 14 are engaged by the cam edges 62' of cutouts 62 in slide 24. As explained above, the turning of the locking member 20 by the cam edge of cutout 25, effects release of the tab 15 so that spring-loaded lever 13 shifts tab 15 back to its inoperative raised position in which it cannot be engaged by the stop lever 49, 50 when the carriage moves again. The control arrangement is now ready for the next operation, and if printing in another column is desired, the corresponding tab 15 is rendered operative by energizing the respective electromagnetic means 4. In this manner, the carriage can be stopped in any selected column. The electric control means 76 can be of different construction. A simple control device 76 in which the switches are closed by manually operated keys may be used, but the switches can also be controlled by apparatus sensing punched holes in a punched program card. Other program means may, of course, also be used for controlling the closing of the switches which select one of the electromagnetic means 4 (79 to 82). The main switch 78, and the secondary switch 78' are controlled by the operating means of the accounting machine, or by operating members which are actuated when a summing operation is carried out.

When it is desired to add the entries in a line which were made in several columns, shaft 53 is turned, for example through an angle of 49°, and such turning movement is either effected by operation of a key, or automatically by the cyclically operating means of the accounting machine. When shaft 53 turns, link 58 is shifted, so that stud 60 shifts slide 24 such a distance to the right that all pins 14 of all tabs 15 are engaged by the cam edges 62' and are downwardly shifted until all tabs are in the lower operative position, while pins 14 are locked in recesses 63. Consequently, the carriage is stopped in each column by the tabulator stops.

At the same time, the shifting members 64, see FIG. 3, which are provided for setting the machine to a different program, are controlled in such a manner that the program tabs which effected the carriage return after each entry in a column, are rendered inoperative so that the paper carriage will not return to its initial position after having been stopped by a tab 15, but will move from tab to tab to stop in each column. During this movement, the accounting machine automatically prepares the condition for the automatic addition of the entries of the respective line. However, these functions can also be initiated by manually operated means.

It will be understood that each of the elements described above, or two or more together, may also find a useful application in other types of accounting machines differing from the types described above.

While the invention has been illustrated and described as embodied in a motion control arrangement for the paper carriage of an accounting machine permitting the individual setting of single tabulator tabs associated with selected columns, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A carriage motion control arrangement comprising, in combination, a frame; a carriage mounted on said frame for movement between an initial terminal position and another terminal position, and adapted to support a form having columns; a set of tab means correlated with the columns of the form and mounted on said carriage for movement with the same, each tab means being movable between an inoperative position, and an operative position in which said tab means move along a path with said carriage; stop means having a position located in said path for engaging a tab means in said operative position to stop said carriage in the column associated with the respective tab means; a set of operating means respectively connected to said tab means for moving the same individually to and from said operative position, each operating means including an electromagnetic means; and control means mounted on said frame for selectively energizing each of said electromagnetic means to set a tab means associated with a selected column to said operative position while said carriage is in said initial terminal position so that said carriage moves from said initial terminal position directly and without stopping in intermediate columns to said selected column where it is stopped by engagement of the set tab means by said stop means.

2. A carriage motion control arrangement comprising, in combination, a frame; a carriage mounted on said frame for movement between an initial terminal position and other terminal position, and adapted to support a form having columns; a set of tab means correlated with the columns of the form and mounted on said carriage for movement with the same, each tab means being movable between an inoperative position, and an operative position in which said tab means move along a path with said carraige; stop means having a position located in said path for engaging a tab means in said operative position to stop said carriage in the column associated with the respective tab means; a set of operating means respectively connected to said tab means for moving the same individually to and from said operative position, each operating means including an electro-magnetic means mounted on said carriage; and control means mounted on said frame for selectively energizing each of said electromagnetic means to set a tab means associated with a selected column to said operative position while said carriage is in said initial terminal position so that said carriage moves from said initial terminal position directly and wthout stopping in intermediate columns to said selected column where it is stopped by engagement of the set tab means by said stop means.

3. A carriage motion control arrangement comprising, in combination, a frame; a carriage mounted on said frame for movement between an initial terminal position and another terminal position, and adapted to support a form having columns; a set of tab means correlated with the columns of the form and mounted on said carriage for movement with the same, each tab means being movable between an inoperative position, and an operative position in which said tab means move along a path with said carriage; stop means having a position located in said path for engaging a tab means in said operative position to stop said carriage in the column associated with the respective tab means; a set of operating means respectively connected to said tab means for moving the same individually to and from said operative position, each operating means including an electromagnetic means; control means mounted on said frame for selectively energizing each of said electromagnetic means to set a tab means associated with a selected column to said operative position while said carriage is in said initial terminal position so that said carriage moves from said initial terminal position directly and without stopping in intermediate columns to said selected column where it is stopped by engagement of the set tab means by said stop means; and clearing means including first means mounted on said frame, and second means mounted on said carriage and cooperating with said first means in said initial terminal position of said carriage so as to cause movement of each tab means which is in said operative position to said inoperative position when said carriage arrives in said initial terminal position after return movement from a selected column.

4. A carriage motion control arrangement comprising in combination, a frame; a carriage mounted on said frame for movement between an initial terminal position and another terminal position, and adapted to support a form having columns; a set of tab means correlated with the columns of the form and mounted on said carriage for movement with the same, each tab means being movable between an inoperative position, and an operative position in which said tab means move along a path with said carriage; spring means biasing each of said tab means to move out of said operative position to said inoperative position; stop means having a position located in said path for engaging a tab means in said operative position to stop said carriage in the column associated with the respective tab means; a set of operating means respectively connected to said tab means for moving the same individually to said operative position, each operating means including an electromagnetic means; locking means for locking each of said tab means in said operative position and being mounted on said carriage; control means mounted on said frame for selectively energizing each of said electromagnetic means to set a tab means associated with a selected column to said operative position while said carriage is in said initial terminal position so that said carriage moves from said initial terminal position directly and without stopping in intermediate columns to said selected column where it is stopped by engagement of the set tab means by said stop means; and clearing means including first means mounted on said frame, and second means mounted on said carriage and cooperating with said first means in said initial terminal position of said carriage, said second means being operatively connected to said locking means and inactivating the same when cooperating with said first means so that said locking means release the set tab means when said carriage arrives in said initial terminal position after return movement from a selected column whereby said tab means is moved by said spring means to said inoperative position.

5. A carriage motion control arrangement comprising, in combination, a frame; a carriage mounted on said frame for movement between an initial terminal position and another terminal position, and adapted to support a form having columns; a set of tab means correlated with the columns of the form and mounted on said carriage for movement with the same, each tab means being movable between an inoperative position, and an operative position in which said tab means move along a path with said carriage; stop means having a position located in said path for engaging a tab means in said operative position to stop said carriage in the column associated with the respective tab means; a set of operating means respectively connected to said tab means for moving the same individually to and from said operative position, each operating means including an electromagnetic means mounted on said carriage; control means mounted on said frame for selectively energizing each of said electromagnetic means to set a tab means associated with a selected column to said operative position while said carriage is in said initial terminal position so that said carriage moves from said initial terminal position directly and without stopping in intermediate columns to said selected column where it is stopped by engagement of the set tab means by said stop means; and clearing means for moving any tab means in said operative position to said inoperative position when said carriage is in said initial terminal position.

6. A carriage motion control arrangement comprising, in combination, a frame; a carriage mounted on said frame for movement between an initial terminal position and another terminal position, and adapted to support a form having columns; a set of tab means correlated with the columns of the form and mounted on said carriage for movement with the same, each tab means being movable between an inoperative position, and an operative position in which said tab means move along a path with said carriage; stop means having a position located in said path for engaging a tab means in said operative position to stop said carriage in the column associated with the respective tab means; a set of operating means respectively connected to said tab means for moving the same individually to and from said operative position, each operating means including an electromagnetic means mounted on said carriage; locking means mounted on said carriage for locking each of said tab means in said operative position; control means mounted on said frame for selectively energizing each of said electromagnetic means to set a tab means associated with a selected column to said operative position while said carriage is in said initial terminal position so that said carriage moves from said initial terminal position directly and without stopping in intermediate columns to said selected column where it is stopped by engagement of the set tab means by said stop means; and clearing means connected to said locking means to cause release of said tab means by said locking means and movement of any tab means in said operative position to said inoperative position when said carriage is in said initial terminal position.

7. A carriage motion control arrangement comprising, in combination, a movable carriage adapted to support a form having columns; a set of tab means correlated with the columns of the form and mounted on said carriage for movement with the same, said tab means being shiftable to and from an operative position, said tab means in said operative position moving along a path with said carriage; a set of locking members mounted on said carriage in the region of said tab means, respectively; springs biasing said locking members to move to a locking position for locking said tab means in said operative position; shiftable means mounted on said carriage for movement between a first position, and a second position for moving said locking members out of said locking position; stop means having a position located in said path of movement of said tab means in said operative position for engaging the same to stop said carriage; and a set of operating means including electromagnetic means for moving selected tab means, respectively to said operative position whereby said carriage can be stopped in selected positions correlated with selected columns, and spring means for urging said tab means out of said operative position upon release by said locking means.

8. A carriage motion control arrangement comprising, in combination, a movable carriage adapted to support a form having columns, said carriage having an initial terminal position and being movable in one direction away from said initial position and in an opposite direction back to said initial position; a set of tab means correlated with the columns of the form and mounted on said carriage for movement with the same, said tab means being shiftable to and from an operative position, said tab means in said operative position moving along a path with said carriage; a set of locking members mounted on said carriage in the region of said tab means, respectively; springs biasing said locking members to move to a locking position for locking said tab means in said operative position; shiftable means mounted on said carriage for movement between a first position, and a second position for moving said locking members out of said locking position; stationary cam means disposed to be engaged by said shiftable means in said initial position of said carriage for shifting said shiftable means to said second position whereby said locking means release said tab means when said carriage returns to said initial position; stop means having a position located in said path of movement of said tab means in said operative position for engaging the same to stop said carriage; and a set of operating means including electromagnetic means for moving selected tab means, respectively, to said operative position whereby said carriage can be stopped in selected positions correlated with selected columns, and spring means for urging said tab means out of said operative position upon release by said locking means.

9. A carriage motion control arrangement comprising, in combination, a movable carriage adapted to support a form having columns; a set of tab means correlated with the columns of the form and mounted on said carriage for movement with the same, said tab means being shiftable to and from an operative position, said tab means in said operative position moving along a path with said carriage; a set of spring-loaded operating members respectively connected to said tab means and urging the same out of said operative position; a set of locking members mounted on said carriage in the region of said tab means; springs biasing said locking members to move to a locking position for locking said tab means in said operative position; means for releasing said locking members in a selected position of said carriage; stop means having a position located in said path of movement of said tab means in said operative position for engaging the same to stop said carriage; and a set of operating means including electromagnetic means for moving selected tab means, respectively, to said operative position whereby said carriage can be stopped in selected positions correlated with selected columns said spring-loaded operating members being connected to said electromagnetic means to move said tab means to said operative position when said electromagnetic means are energized.

10. An arrangement as set forth in claim 9 wherein each of said locking members is a locking lever turnably mounted on said carriage and having a cutout; wherein each of said operating members is an operating lever turnably mounted on said carriage and having a cutout; and wherein each of said tab means has a projecting portion located in said cutout of the respective operating lever, and being located in said cutout of the respective locking lever when the same is in said locking position.

11. An arrangement as set forth in claim 10 wherein said means for releasing said locking members include a slide having a plurality of cam edges respectively engaging said locking members so that said locking members are turned out of said locking position when said slide is shifted.

12. An arrangement as set forth in claim 11 wherein said carriage has an initial position and is movable in one direction away from said initial position and in an opposite direction back to said initial position; cam follower means connected to said slide; and stationary cam means disposed to engage said cam follower means in said initial position of said carriage for shifting said slide to effect release of said tab means by said locking levers when said carriage returns to said initial position.

13. An arrangement as set forth in claim 12 wherein said slide has other cam edges for respectively engaging said tab means; and means for shifting said slide to a position in which said other cam edges shift all said tab means to said operative position.

14. A carriage motion control arrangement comprising, in combination, a movable carriage adapted to support a form having columns and being movable in one direction away from an initial terminal position and in an opposite direction back to said initial position; a set of tab means adapted to be correlated with the columns of the form and being mounted on said carriage for movement with the same, said tab means being shiftable to and from an operative position, said tab means in said operative position moving along a path with said carriage, said tab means having springs for being moved out of said operative position; a set of electromagnetic means for moving selected tab means to said operative position; stop means having a position located in the path of movement of said tab means in said operative position for engaging the same to stop said carriage; a plurality of locking members mounted on said carriage engaging said tab means, respectively, said locking members having springs for being moved to a locking position for locking the respective tab means in said operative position; a slide shiftably mounted on said carriage for movement between a normal position and a shifted position and being operatively connected to said locking members for moving the same in said shifted position out of said locking position; spring means biasing said slide to move to said normal position; a spring-loaded coupling member turnably mounted on said slide for movement with the same and being biased to turn in one direction; a control member turnably mounted on said carriage and having a first control position engaging said coupling member to control the turning movement of the same, said control member having a second control portion abutting said coupling member in a coupling position; and means for turning said control member to shift said slide through said coupling member to said shifted position.

15. A carriage motion control arrangement comprising, in combination, a movable carriage adapted to support a form having columns and being movable in one direction away from an initial terminal position and in an opposite direction back to said initial position; a set of tab means adapted to be correlated with the columns of the form and being mounted on said carriage for movement with the same, said tab means being shiftable to and from an operative position, said tab means in said operative position moving along a path with said carriage, said tab means having springs for being moved out of said operative position; a set of electromagnetic means for moving selected tab means to said operative position; stop means having a position located in the path of movement of said tab means in said operative position for engaging the same to stop said carriage; a plurality of locking members mounted on said carriage engaging said tab means, respectively, said locking members having springs for being moved to a locking position for locking the respective tab means in said operative position; a slide shiftably mounted on said carriage for movement between a normal position and a shifted position and being operatively connected to said locking members for moving the same in said shifted position out of said locking position; spring means biasing said slide to move to said normal position; a spring-loaded coupling member turnably mounted on said slide for movement with the same and being biased to turn in one direction; a control member turnably mounted on said carriage and having a first control portion engaging said coupling member to control the turning movement of the same, said control member having a second control portion abutting said coupling member in a coupling position; shiftable linkage means connected to said control member and being mounted on said carriage, said linkage means including a cam follower and spring means; and stationary cam means disposed to be engaged by said cam follower in said initial position of said carriage for shifting said linkage means for turning said control member, said cam means releasing said cam follower when said carriage moves in said one direction out of said initial position so that said control member is turned by said linkage means to a position permitting said coupling member to turn in said one direction to said coupling position in which said second control portion of said control member abuts said coupling member, said cam follower engaging said cam means again when said carriage moves in said opposite direction back to said initial position whereby said control member is turned through said linkage means to shift said coupling member in said coupling position so that said slide moves to said shifted position whereby said locking members are moved by said slide out of said locking position and release said tab means for movement out of said operative position.

16. A tabulating arrangement as set forth in claim 15 wherein said first control portion of said control member is a projecting pin abutting said control member; and wherein said coupling member has a coupling portion engaged by said second control portion of said control member in said coupling position, said coupling member having a pivot axis substantially aligned with said coupling portion in the direction of the movement of said slide when said coupling member is in said coupling position.

17. A tabulating arrangement as set forth in claim 16 wherein said stationary cam means effects during the movement of said carriage back to said initial position turning movement of said control member to a position in which said pin turns said coupling member out of said coupling position to a position in which said second control portion of said control member releases said coupling portion of said coupling member.

18. An arrangement as set forth in claim 15 wherein said slide has a set of cutouts bounded by cam edges, wherein each of said locking members has a transverse pin projecting into said cutouts and cooperating with said cam edges so that said locking members are moved out of said locking position while said pins slide on said cam edges during movement of said slide to said shifted position.

19. An arrangement as set forth in claim 15 wherein said shiftable linkage means include a shaft turnably mounted on said carriage and supporting said control member, a first lever fixed to said shaft, a second lever turnably mounted on said carriage, a link connecting said first and second levers, an angular lever turnably mounted on said shaft and operatively connected to said second lever, said angular lever having an arm transverse to the direction of movement of said carriage and constituting said cam follower which cooperates with said stationary cam means; and said stationary cam means having a cam track including a portion parallel to the direction of movement of said carriage and an inclined portion.

20. A carriage motion control arrangement comprising, in combination, a movable carriage adapted to support a form having columns and being movable in one direction away from an initial terminal position and in an opposite direction back to said initial position; a set of tab means adapted to be correlated with the columns of the form and being mounted on said carriage for movement with the same, said tab means being shiftable to and from an operative position, said tab means in said operative position moving along a path with said carriage, said tab means having springs for being moved out of said operative position, each tab means having a cam follower portion; a set of electromagnetic means for moving selected tab means to said operative position; stop means having a position located in the path of movement of said tab means in said operative position for engaging the same to stop said carriage; a plurality of locking members mounted on said carriage engaging said tab means, respectively, said locking members having springs for being moved to a locking position for locking the respective tab means in said operative position; a slide shiftably mounted on said carriage for movement between a normal position and a shifted position and being operatively connected to said locking members for moving the same in said shifted position out of said locking position, said slide having a set of cam means respectively cooperating with said cam portions of said tab means and being shiftable beyond said shifted position to another shifted position in which said cam means hold all said tab means in said operative position; operable means for shifting said slide to said other shifted position; spring means biasing said slide to move to said normal position; a spring-loaded coupling member turnably mounted on said slide for movement with the same and being biased to turn in one direction; a control member turnably mounted on said carriage and having a first control portion engaging said coupling member to control the turning movement of the same, said control member having a second control portion abutting said coupling member in a coupling position; shiftable linkage means connected to said control member and being mounted on said carriage, said linkage means including a cam follower and spring means and stationary cam means disposed to be engaged by said cam follower in said initial position of said carriage for shifting said linkage means for turning said control member, said cam means releasing said cam follower when said carriage moved in said one direction out of said initial position so that said control member is turned by said linkage means to a position permitting said coupling member to turn in said one direction to said coupling position in which said second control portion of said control member abuts said coupling member, said cam follower engaging said cam means again when said carriage moves in said opposite direction back to said initial position whereby said control member is turned through said linkage means to shift said coupling member in said coupling position so that said slide moves to said shifted position whereby said locking members are moved by said slide out of said locking position and release said tab means for movement out of said operative position.

21. An arrangement as set forth in claim 20 wherein each said tab means includes a tab shiftable to and from said operative position, an operating lever turnably mounted on said carriage and connected to said tab for shifting the same, said spring of said tab means acting on said operating lever; and a shaft connected to each operating lever, a fixed lever arm on each shaft, each lever arm being connected to one of said electromagnetic means.

22. An arrangement as set forth in claim 20 wherein said operable means include a lever turnably mounted on said carriage, a projecting member secured to said slide, and a link connecting said lever with said projecting member.

23. An arrangement as set forth in claim 20 wherein said stationary cam means effects during movement of said carriage back to said initial position turning movement of said control member to turn said coupling member opposite to said one turning direction out of said coupling position to a position in which said second control portion of said control member releases said coupling portion of said coupling member before said slide arrives in said other shifted position.

24. An arrangement as set forth in claim 23 wherein said slide is formed with a set of openings, each opening having an oblique cam edge constituting said cam means and engaging said tab means for moving the same to said operative position when said slide moves to said other shifted position.

References Cited in the file of this patent

UNITED STATES PATENTS

| | | |
|---|---|---|
| 1,935,436 | Crumrine | Nov. 14, 1933 |
| 2,860,759 | Clark | Nov. 18, 1958 |
| 2,953,231 | Dersch | Sept. 20, 1960 |